Figure 3:
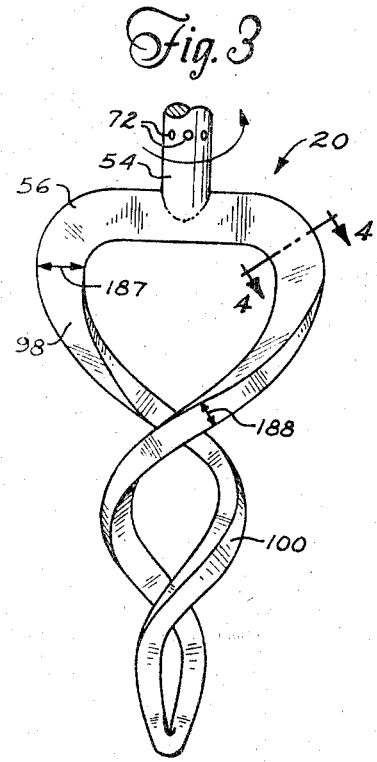

April 18, 1967 — W. ARBITER — 3,314,660
MIXER
Filed June 11, 1965 — 3 Sheets-Sheet 1
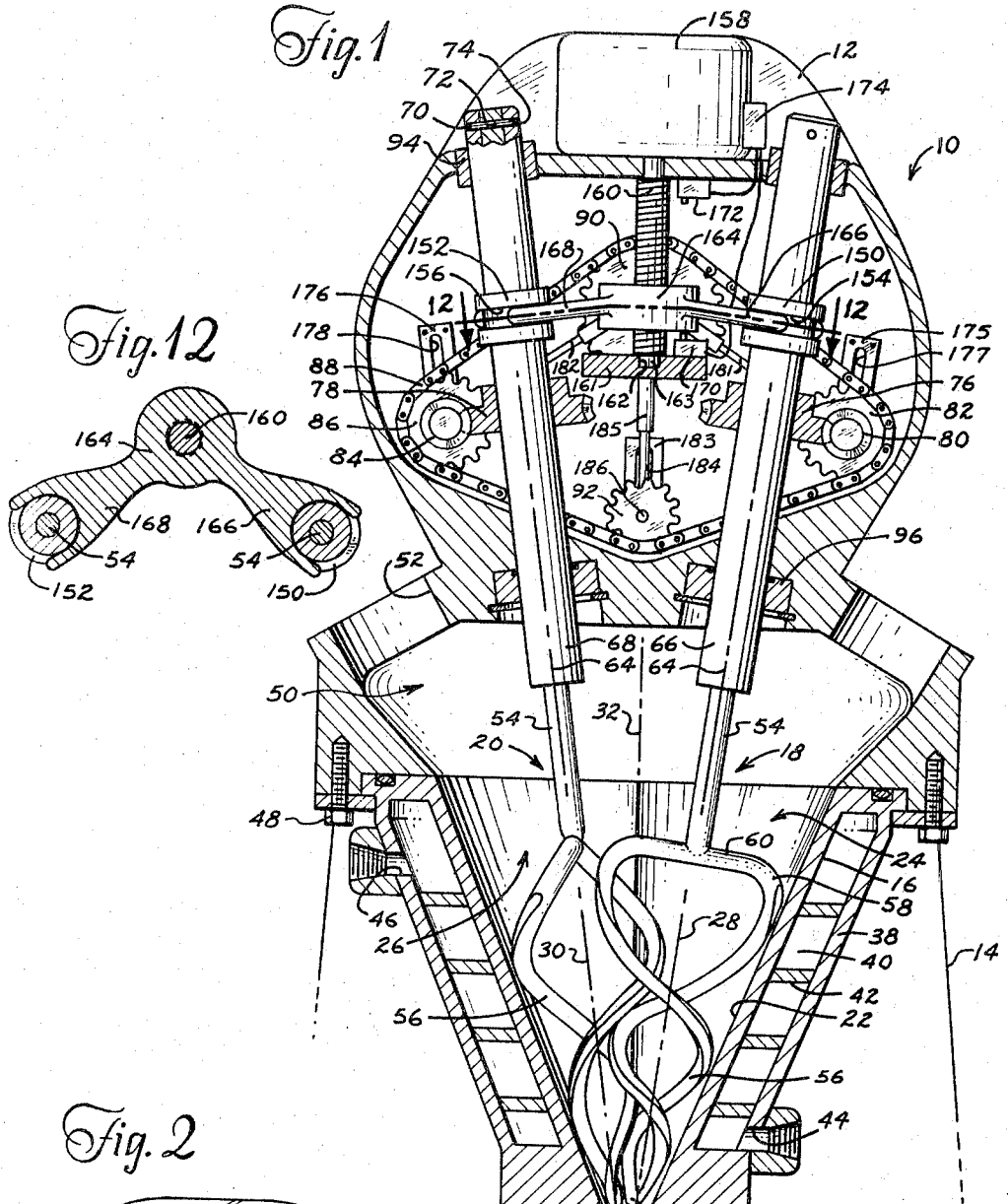
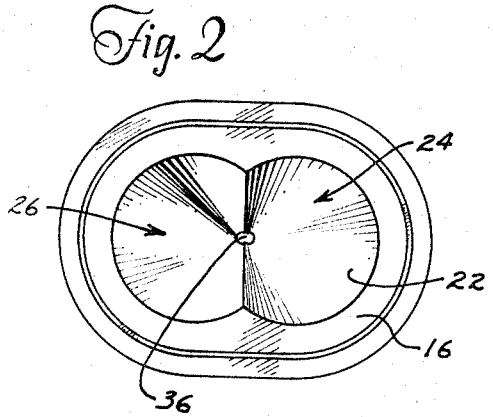
INVENTOR
WILLIAM ARBITER
BY Lawrence R. Hepler
ATTORNEY April 18, 1967     W. ARBITER     3,314,660

MIXER

Filed June 11, 1965     3 Sheets-Sheet 2

INVENTOR

WILLIAM ARBITER

BY *Lawrence R. Hefter*

ATTORNEY

April 18, 1967
W. ARBITER
3,314,660
MIXER
Filed June 11, 1965
3 Sheets-Sheet 3
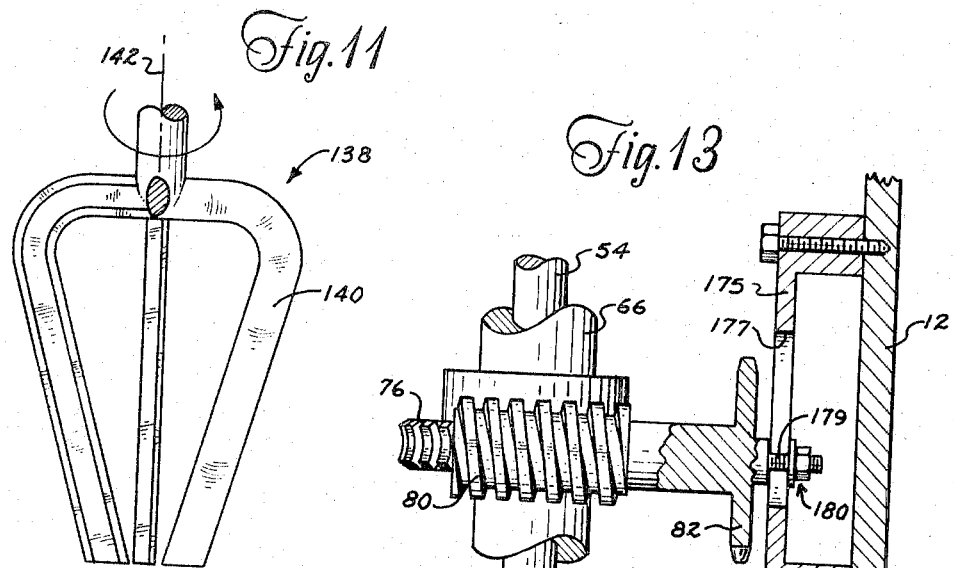
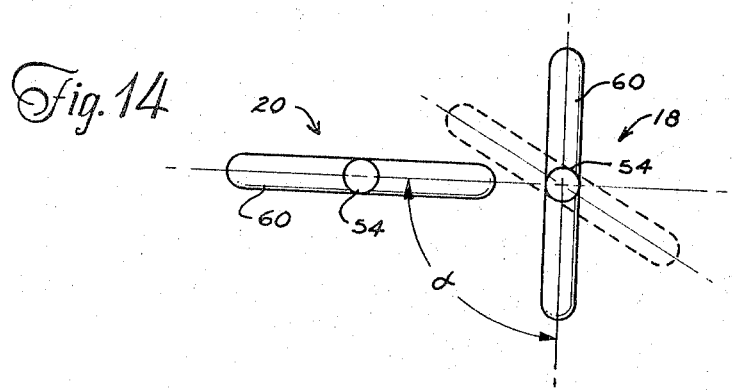
INVENTOR
WILLIAM ARBITER
BY Lawrence R. Hepfer
ATTORNEY

United States Patent Office 3,314,660
Patented Apr. 18, 1967

3,314,660
MIXER
William Arbiter, Springfield, Va., assignor to Atlantic Research Corporation, Fairfax, Va., a corporation of Virginia
Filed June 11, 1965, Ser. No. 463,293
35 Claims. (Cl. 259—102)

This invention relates to apparatus broadly referred to as a mixer and, more particularly, to various modifications of mixing blades to increase the mixing efficiency, versatility and usefulness of the mixing apparatus.

It is one object of this invention to provide mixing apparatus having new and improved mixing blades.

It is another object of this invention to provide mixing apparatus having easily and accurately varied blade-to-blade and blade-to-wall clearances.

It is another object of this invention to provide mixing apparatus which rapidly effect total dispersion of the mix ingredients.

It is a further object of this invention to provide mixing apparatus which permit continued measurement of various properties of the mix concurrently with the mixing process.

Other objects and attendant advantages will become apparent from the following detailed description and accompanying drawings.

Briefly stated, this invention, in one form, provides mixing apparatus including a substantially vertically oriented receptacle or mixing bowl having an interior surface of generally conical shape and a pair of mixing blades rotatably mounted within the receptacle. Each of the mixing blades includes a shaft and a plurality of downwardly convergent helical blade elements rigidly attached at the upper end to the shaft. The elements generate a substantially conical surface during rotation thereof with the apex of the generated conical surface being adjacent to the bottom of the receptacle. The blades are mounted within the receptacle such that the elements of each blade interdigitate with the elements of the other blade. Furthermore, the axes of the blades are inclined with respect to the axis of the receptacle and with respect to the axis of each other. Motor means are provided to impart a rotary motion to each of the blades simultaneously at the same speed to avoid interference of one blade with the other. Because of the conical envelope described by each rotating blade combined with the generally conical shape of the receptacle, uniform clearance can be maintained between the blades and the receptacle and the clearance therebetween can be adjusted by raising or lowering the blades with respect to the receptacle. In order to continuously vary the clearance between the blades and the receptacle to augment the mixing action resulting from blade rotation, second motor means are provided to afford simultaneous corresponding reciprocating axial motion to each of the blades with respect to the receptacle during rotation of the blades. Because the axes of the blades are inclined with respect to each other, the reciprocating axial motion of each of the blades additionally effects continuous variation in clearance between the respective blades.

Additional means are provided to vary the clearance between the blades through limited relative rotation of one blade with resepct to the other. Such means comprise mounting the shaft of each of the blades within a sleeve which, in turn, is supported by appropriate bearings. The sleeve is fixedly attached to the shaft by any conventional means such as pinning it thereto. By providing a plurality of pin holes laterally through the shaft, each hole being circumferentially displaced from the other holes, the particular orientation of the blades about the blade axis may be adjusted at will by merely removing the pin and rotating the shaft with respect to the sleeve and then reinserting the pin to maintain the blade in the desired position. Because of the interdigitation of the blades as well as the design of the blades, clearance between them can be varied from a maximum when the blades are 90° out of phase with one another to a minimum when the blades approach alignment. Therefore, it can be seen that the clearance between the blades is a function of the phase angle between the blades, which angle can be varied by merely rotating one of the blades with respect to the other.

The blade shaft is provided with an axial bore which communicates with the interior of the recpetacle to afford communication with the mix contained within the receptacle during operationg of the mixing apparatus. An axially adjustable conduit is slideably mounted within the bore through which a fluid, either liquid or gas, may be injected into the mix at any point along the length of the blades. Furthermore, by providing a pressure-reducing system communicating with the conduit, a portion of the mix may be removed at any point along the length of the blade for sampling purposes. Additionally, the conduit provides a housing for a thermocouple and/or a viscometer to allow continuous measurement of certain properties of the mix at various levels within the receptacle during operation of the mixing apparatus.

While helical, conical mixing blades rotating within a generally conical, vertically aligned receptacle achieves improved mixing over other types of mixers, this mixing is improved further by constructing each of the mixing blade elements such that the angle of attack of each element in a horizontal plane is oblique to the tangential velocity vector. This angle of attack is formed by rotating the leading face of the element about an axis parallel to the axis of the mixing blade shaft. The oblique angle of attack imparts a transverse flow component to the mix which supplements the already-existing transverse flow components and axial flow components to improve the mixing action. A particularly desirable blade cross section is a triangular cross section with a leading face of the element having a portion thereof facing or oriented inwardly toward the shaft axis and a portion thereof oriented outwardly away from the shaft axis to provide transverse flow towards and away from the shaft axis.

To maximize the volume of mix contained within the receptacle during operation of the mixing apparatus, a constant ratio of blade to receptacle volume is maintained throughout the depth of the receptacle. This is accomplished by maintaining the blade volume per unit depth as a constant fraction of the receptacle volume per unit depth or by maintaining the blade elements' width and thickness as constant fractions of the diameter of the conical surface generated by the rotating blade.

Figure 7:
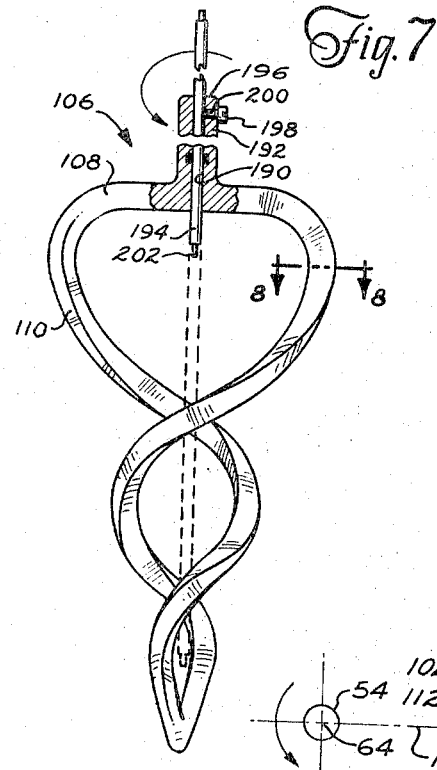

The invention, which was briefly described above, is more specifically described below in combination with the accompanying drawings, in which FIGURE 1 is a sectional elevational view of a mixer formed in accordance with this invention, FIGURE 2 is a top view of the mixing receptacle employed in the mixer of FIGURE 1, FIGURE 3 is a perspective view of a mixing blade employed in the mixer of FIGURE 1, FIGURES 4, 5 and 6 are schematic crass sections of three embodiments of the blade illustrated in FIGURE 3, FIGURE 7 is a second form of blade of the type employed in the mixer of FIGURE 1, FIGURES 8, 9 and 10 are schematic cross sections of three embodiments of the blade illustrated in FIGURE 7, FIGURE 11 is a third form of blade of the type employed in the mixer of FIGURE 1, FIGURE 12 is a sectional view taken along the line 12—12 of FIGURE 1, FIGURE 13 is a partially sectioned end view of a sprocket wheel and mounting therefor employed in the mixer of FIGURE 1, and FIGURE 14 is a schematic top view of the blades illustrated in FIGURE 1.

For clarification, where the mixing blades have been described as generating a substantially conical surface, it is to be understood that the conical surface may be truncated such that the apex of the surface is displaced from the end of the blade elements. Furthermore, where the receptacle has been described as having a generally conical shape, this description is intended to include the intersecting conical arrangement illustrated in FIGURES 1 and 2 as well as a true conical shape.

GENERAL DESCRIPTION

Referring now to the drawings, and more particularly to FIGURE 1, there is shown a mixing apparatus 10 including a housing 12 and a base 14 supporting the housing 12. Attached to the lower end of the housing 12 is a mixing bowl or receptacle 16, within which are rotatably mounted a pair of mixing blades 18, 20. A preferred form of interior surface 22 of the receptacle 16 is illustrated in FIGURES 1 and 2 as being formed by two intersecting cones 24, 26 whose longitudinal axes 28, 30 respectively, are inclined at equal angles from the substantially vertical axis 32 of the receptacle 16. The cones 24, 26 are inverted or, in other words, oriented such that the base of each of the cones is displaced upwardly with respect to the apex of the cones, and the cones' axes 28, 30 are inclined with respect to the substantially vertical receptacle axis 32 such that the cones' axes 28, 30 intersect below the bases of the cones 24, 26, as illustrated at the point of intersection denoted as 34. This structure provides an interior surface 22, clearly shown in FIGURE 2, having the shape of the nonintersecting peripheral portions of the intersecting cones 24, 26 throughout the entire length of the receptacle 16. The cones 24, 26 are truncated to provide a discharge port 36 at the bottom of the receptacle through which the mix is discharged.

The receptacle is provided with an outer jacket 38 spaced from the receptacle 16 to provide an annular chamber 40 for the circulation of a thermal medium such as a fluid heating or cooling medium in heat-exchange relationship with the receptacle 16. A plurality of spacers 42 extend between the jacket 38 and the receptacle 16 to provide the desired structural rigidity. An inlet bore 44 and an outlet bore 46 extend through the jacket 38 to permit continuous circulation of the thermal medium about the receptacle 16.

The receptacle 16 is attached to the lower end of the housing 12 by any conventional means, such as bolting it thereto with a plurality of bolts 48. The lower portion of the housing 12 which is immediately adjacent to the receptacle 16 includes a cavity or loading chamber 50 which communicates with the interior of the receptacle 16. One or more ports 52 extend through the housing 12 and communicate with the loading chamber 50 through which the ingredients to be mixed are admitted into the interior of the receptacle 16.

Positioned within the receptacle 16 and housing 12 are a pair of matched mixing blades 18, 20. Each of the blades includes an elongated cylindrical shaft 54 and a pair of ribbon-type blade elements 56. The upper end 58 of each element 56 is radially displaced from the shaft 54 and rigidly attached to the shaft by means of a bar 60 which can be formed integrally with the element 56, as illustrated. The elements are formed with a downwardly convergent shape such that the lower end 62 of each of the elements 56 approaches the axis 64 of its respective blade. The lower end 62 of each of the elements 56 joins the lower end of each of the other elements of their respective blade to form a unitary blade. The blades 18, 20 illustrated in FIGURE 1 each include two elements which may be formed as a single integral unit, but for description purposes, each individual ribbon is referred to as an element. It can be seen that the elements 56 of each blade generate a substantially conical surface during rotation thereof with the apex of the conical surface being formed at the lower end of the blades and the base of the conical surface being formed by the bar 60 at the upper end 58 of the elements 56.

The blades 18, 20 are mounted within the receptacle 16 with one blade residing within each cone which forms a portion of the receptacle 16. The axes 64 of the blades 18, 20 are displaced from one another such that the conical surface generated by each of the blades conforms to the inner surface 22 of the portion of the receptacle in which each of the blades resides. This arrangement provides a uniform clearance between the elements 56 and the inner surface 22 of the receptacle 16. The radial or transverse dimensions of the blades 18, 20 are sufficiently large to ensure interdigitation between the blades as may be seen in FIGURE 1. The helical ribbon elements 56 of one of the blades 18 are formed as clockwise spirals while the helical ribbon elements 56 of the other blade 20 are formed as counterclockwise spirals. When mounted within the receptacle 16, the blades 18, 20 are positioned out of phase with one another so that the elements of one blade never contact the elements of the other blade, albeit the generated conical surfaces of the blades intersect throughout the length of the blades as a result of the interdigitation of the blades. As is explained below, the blades 18, 20 are synchronized to rotate in opposite directions at identical speeds to maintain the interdigitation while avoiding contact therebetween.

The upper portion of the shafts 54 of the blades 18, 20 are each enclosed within and fixedly attached to the sleeves 66, 68 respectively. The shafts 54 are attached to the sleeves by any suitable means which prevents relative rotational motion between the shaft and its respective sleeve, such as a pin 70 passing through a lateral hole 72 extending through the shaft and a corresponding hole 74 provided through the sleeve. The sleeves 66, 68 additionally serve as shafts for pinion gears 76, 78, one gear being mounted on each of the shafts. The pinion gear 76 is driven in one direction by worm gear 80 which is drivingly connected to a sprocket wheel 82 while the pinion gear 78 is driven in the opposite direction by another worm gear 84 which is drivingly connected to a sprocket wheel 86 spaced from the first mentioned sprocket wheel 82. The sprocket wheels 82, 86 are driven by means of a chain 88, which, in turn, is driven by a driving sprocket wheel 90. The driving sprocket wheel 90 is rotated by any standard reversible, variable speed motor, not shown. An idler sprocket 92 is supplied to maintain the proper tension in the chain 88. In order to produce counter rotation between the mixing blades 18 and 20, the worm gears 80 and 84 have oppositely directed pitches. For example, to provide clockwise rotation of mixing blade 18, the pitch of worm gear 80 is in a direction in toward the paper as viewed in FIGURE 1 while the pitch of worm gear 84 is in a direction coming outwardly from the paper as viewed in FIGURE 1. To provide identical rotational speeds to the mixing blades 18, 20 the sprocket wheels 82, 86 are of equal diameter as are the worm gears 80, 84 and the pinion gears 76, 78. In other words, the driving system for each mixing blade is dimensionally identical.

The mixing blade shaft 54 is supported at its upper end in journal bearing 94 and at its lower end in journal bearing 96. This dual support for each blade shaft eliminates transverse movement of the mixing blades 18, 20 thereby preventing misalignment of the blades and concomitant intersection of the blades during their rotation.

As shown in FIGURE 1, the lower end of the receptacle 16 is provided with a discharge port 36 through which the mixed ingredients exit. If desired, an obturator such as a slide valve (not shown) can be provided to close the port 36 to allow continuous mixing of the ingredients before the mix is removed from the receptacle 16.

As will be seen in the next section which specifically describes the mixing action achieved by the mixing apparatus described above, one component of the mixing action provides a positive downwardly directed force on the mix which supplements the gravitational force and causes the mix to flow downwardly. These two downwardly acting forces provide the mixing apparatus 10 with an ability to extrude the mix through the discharge port 36 into any desired container such as a mold (not shown). When mixing of the ingredients within the receptacle 16 is completed, discharge of the mix is accomplished by merely opening the discharge port 36. The blades continue their rotation and the action of the blades pushing the mix downwardly causes the mix to be completely emptied from the receptacle 16 by extrusion through the discharge port 36 in a minimum amount of time.

While the mixing apparatus 10 has been described solely as a mixer, it should be noted that because of the superior mixing ability of the apparatus and because the mechanics of reactions require interface contact between the several reactants involved, the apparatus 10 also serves as an efficient reactor. In many reactions, one or more products of reaction is a gaseous medium which, to expedite the completion of the reaction, should be removed from the reactor chamber. The gaseous medium rises to the surface of the reactants and can be removed by applying a vacuum source (not shown) to the space above the liquid surface, for example, the loading chamber 50. The generally conical configuration of the receptacle 16 provides a ratio of the exposed surface area to the receptacle volume which is relatively high, thus promoting and permitting rapid removal of the gaseous reaction products from the receptacle 16. To further encourage rapid removal of the gaseous reaction products, the direction of rotation of the mixing blades 18, 20 is reversed. Such reversal generates an upwardly directed force on the fluid reactants in the area adjacent to the receptacle walls and increases the over-all exposure of the fluid reactants to the evacuated space above the fluid surface. If the reactor residence time required is greater than is achieved if the reactor is operated with the discharge port 36 open, the port is closed until the reaction is sufficiently complete. An additional advantage to the subject apparatus in serving as a reactor is the improved thermal control of the reactants which is obtainable. This is achieved because of the increased over-all movement of the reactants within the receptacle 16 which results in increased heat transfer to or from the reactants through the use of a thermal medium circulating in the annular chamber 40 between the casing 38 and the receptacle 16.

MIXING ACTION

The substantially vertical intersecting cone mixer described above and illustrated in FIGURES 1 and 2 provides a very efficient mixing action which rapidly intermixes the ingredients placed within the mixing bowl or receptacle 16. This type of mixer is especially effective where mixes, such as gels, having relatively high viscosity are involved because with such a mix there is little significant mixing as a result of inertial forces developed in the fluid. Mixing is achieved primarily through mechanical means by physically pushing the material from one portion of the receptacle to another, by continuous kneading of the material, by extension of the contact area between adjacent portions of the mix fluid, and by the division and recombination of portions of the mix. Therefore, any portion of the receptacle which does not frequently contain a mixing blade element is essentially dead or unused volume.

The vertical intersecting cone mixer provides action and interaction of the blade or blades with the receptacle in such a way that an unusually large percentage of the total material is continuously caused to move. This action is achieved through four basic types of material movement. The first type of movement is referred to as "parallel drag flow" which is in a direction parallel to the mixing blade axis and the applied force is downwardly toward the discharge port 36. Parallel drag flow is caused by the force applied to the mix by the elements 56. A second type of material movement is referred to as "leakage flow" and occurs in a direction opposite to the parallel drag flow, i.e., in an upwardly direction away from the discharge port 36. The leakage flow occurs between the mixing blades 18, 20 and the receptacle inner surface 22. The third type of material movement is "pressure flow" which is in a generally upwardly direction. Pressure flow occurs primarily when the discharge port 36 is obturated and, therefore, the mix which is forced downwardly by the elements 56 (parallel drag flow) produces a pressure on the mix residing in the bottom of the receptacle and thus forces that portion of the mix upwardly. The fourth type of material movement is referred to as "transverse drag flow." The direction of transverse flow is transverse to the axis of the mixing blades and provides intermixing of the various channels of fluid moving in a direction essentially parallel to the mixing blade axis. Because of the minimum structure existing in the central zone of the blades 18, 20 throughout their length the blades are ideal for promoting transverse flow of the mix within the receptacle 16, thus substantially improving the over-all mixing efficiency.

Presently existing ribbon-type blades, be they of helical formation or not, usually employ blade elements having rectangular cross sections with the radial axis of the rectangle lying in a plane which also includes the blade axis 64. A helical blade of this configuration is illustrated in the perspective drawing of FIGURE 3 and the schematic cross section drawing of FIGURE 4. FIGURE 3 illustrates the mixing blade 20 having a helical element 56 having a leading face 98 and a trailing face 100 with respect to the direction of rotation of the blade which, for the blade illustrated in FIGURE 3, is counterclockwise. It can be seen in FIGURE 4 that the leading face 98 is normal to the tangential velocity vector 102. This configuration is conducive to imparting parallel drag flow to the mix; however, for maximum mixing efficiency, the more important flow component is the transverse flow component.

INCREASED TRANSVERSE FLOW

Figure 5:
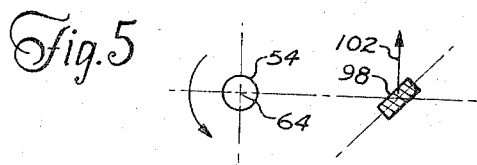
Figure 6:
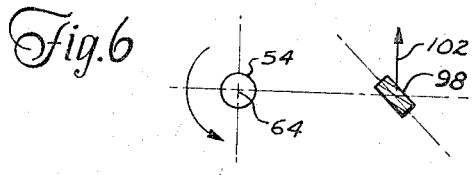

The transverse flow component is increased by providing the leading face 98 with an oblique angle of attack which is defined as the angle between the tangential velocity vector 102 and the plane of the leading face of the mixing blade. This is achieved by rotating the leading face about an axis parallel to the axis 64 of the blade shaft 54. FIGURE 5 illustrates one such configuration wherein the leading face 98 is oriented inwardly towards the shaft axis 64. Rotation of the leading face 98 through an angle of 45° provides the maximum transverse component of material movement and, in the illustration shown in FIGURE 5, causes the mix to flow inwardly toward the center of the blade. FIGURE 6 illustrates a modification wherein the leading face 98 is oriented outwardly away from the shaft axis 64 and thus will increase the transverse flow component in the direction away from the blade axis 64. As can be seen in FIGURES 5 and 6, the radial axis of the rectangular cross section lies in a plane which does not include the blade axis 64.

Figure 8:
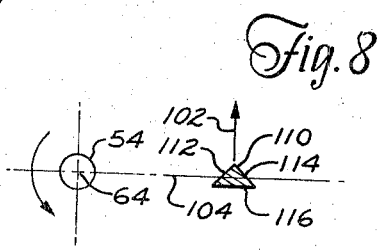
Figure 4:
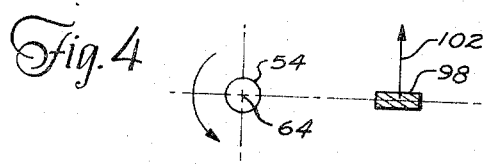

FIGURES 7 through 10 illustrate a different manner of increasing the transverse flow component. In the blade configurations illustrated in FIGURES 7 through 10, the elements' transverse or radial axis 104 remains in a plane which includes the shaft axis 64 as is the case in the conventional rectangular element illustrated in FIGURE 4. However, to increase the transverse flow component, the leading face 98 of the blade element presents an angle of attack which is oblique to the tangential velocity vector 102. For example, the mixing blade 106, the perspective of which is illustrated in FIGURE 7, and the schematic cross section of which is illustrated in FIGURE 8, is provided with an element 108 having a triangular cross section. The triangular cross section provides a leading biplanar face 110 having a portion 112 thereof oriented inwardly toward the shaft axis 64 and a portion 114 thereof oriented outwardly away from the shaft axis 64. The trailing face 116 is planar and oriented normal to the velocity vector 102. Such an element imparts transverse flow to the mix directed both toward and away from the shaft axis 64.

Figure 9:
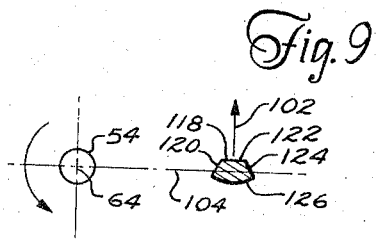

FIGURE 9 illustrates a modification of the mixing blade 106 wherein the element cross section is generally trapezoidal providing a triplanar leading face 118 having a first portion thereof 120 oriented inwardly toward the shaft axis 64, a second portion thereof 122 oriented perpendicular to the velocity vector 102, and a third portion thereof 124 oriented outwardly away from the shaft axis 64. The trailing face 126 can be planar as it is in the previously described triangular element; however, to improve the streamlines behind the element it is preferred that the trailing face 126 be rounded or curved. The trapezoidal configuration promotes increased transverse flow toward and away from the shaft axis 64 as well as promoting parallel drag flow by means of the second portion 122 of the leading face 118 being perpendicular to the tangential velocity vector 102. To obtain the benefits of the increased transverse flow component in the blades illustrated in FIGURES 8 and 9, it is necessary that these blades always be rotated in a direction such that the faces having the oblique surfaces are the leading faces.

Figure 10:
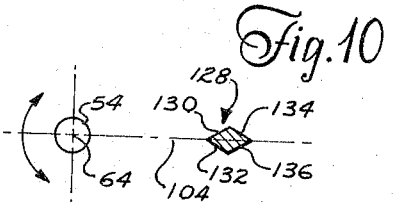

When the mixing apparatus 10 is to be used as a reactor as well as a mixer and extruder, the ability to reverse rotation of the mixing blades without detrimentally affecting the mixing action is desirable. Where such applications are intended, a blade element, the cross section of which is illustrated in FIGURE 10 having both faces thereof provided with an oblique surface with reference to the tangential velocity vector, provides increased transverse flow components regardless of the direction of rotation of the blade. The elements of the blade 128 illustrated in FIGURE 10 are formed with a rhombus cross section wherein each face has a portion 130, 132, respectively, facing inwardly toward the shaft axis 64 and each face has a portion 134, 136 respectively, facing outwardly away from the shaft axis 64 thus promoting transverse flow toward and away from the shaft axis regardless of the direction of rotation of the blade 128.

The particular configuration described above with reference to the leading and trailing faces of the blades in order to promote transverse flow, are illustrative of preferred embodiments, however, it is obvious that other configurations can be provided which present an angle of attack which is oblique to the tangential velocity vector 102. It should also be noted that while the above-discussed cross sections are illustrated as being used with a helical blade, the invention is not restricted to using such cross sections with helical blades since they could also be employed on nonhelical blades of the type illustrated in FIGURE 11. The blade 138 illustrated in FIGURE 11 comprises a plurality of ribbon elements 140 which extend longitudinally downwardly and do not have a helical configuration. The elements 140 are illustrated as having a trapezoidal cross section to impart transverse flow both toward and away from the shaft axis 142 as well as to provide a substantial parallel drag force by the central portion of the trapezoid which is normal to the tangential velocity vector 102.

RECIPROCATING AXIAL BLADE MOTION

In addition to improving the over-all mixing action of a substantially vertical, generally conical mixer by increasing the transverse flow components as described above, this invention also improves the mixing performance by imparting a reciprocating axial motion to each of the mixing blades during rotation thereof. Reverting now to FIGURE 1, there is shown a pair of hubs 150, 152, one of the hubs being fixedly attached to each of the sleeves 66, 68 of the blades 18, 20 respectively. The hubs can be made integrally with the sleeves or they can be fixedly attached thereto by any conventional means such as welding them thereto. An annular groove 154, 156 is provided on the outer surface of each hub 150, 152 respectively, coaxial with the sleeve on which the hub is mounted.

To provide the reciprocating movement of the blades 18, 20, a variable-speed reversible motor 158 is attached to the housing 12 in any suitable manner. A worm gear 160 is drivingly attached at one end to the motor 158 and is supported at the other end by a support plate 161 formed with an internal socket 162 adapted to serve as a bearing for the shaft portion 163 of the gear 160. An annular internal gear 164 cooperatively engages the worm gear 160 and traverses vertically upwardly or downwardly, depending upon the direction of rotation of the worm gear 160. A pair of bifurcated or forked arms 166, 168 are rigidly attached at on end thereof to the outer surface of the annular gear 164. The bifurcated ends are received in the grooves 154, 156, respectively, as can be seen in FIGURES 1 and 12. The arms 166, 168 are open at their bifurcated ends to permit sliding motion between the hubs 150, 152, and the arms 166, 168, respectively. Because the axis of the hubs 150, 152 are inclined with respect to the axis of the worm gear 160, it is necessary that the arms 166, 168 be obliquely disposed with respect to the axis of the worm gear 160. The required angle depends upon the angular displacement of the hubs 150, 152 and is complementary thereto. It can be seen that the vertical motion imparted to the internal gear 164 will be transformed into axial motion of the mixing blades 18, 20 by means of the arms 166, 168 and hubs 150, 152. The journal bearings 94, 96 which prevent transverse movement of the mixing blades 18, 20 permit axial motion of the blade sleeves 66, 68. A pair of vertically displaced limit switches 170, 172 which are operatively connected to a conventional motor control unit 174, are provided at the desired upper and lower extremes of travel of the internal gear 164.

The axial motion imparted to the blade sleeves 66, 68 and blade shafts 54 by the system just described, is also imparted to the pinion gears 76, 78 since they are fixedly mounted on the outer surface of the blade sleeves 66, 68 respectively. Provision must be made to simultaneously cause the sprocket wheels 82, 86 to reciprocate in such a manner as to maintain the driving relationship between the worm gears 80, 84 and their respective pinion gears 76, 78. This is achieved by mounting the sprocket wheels 82, 86 on support brackets 175, 176 which are, in turn, rigidly attached to the housing 12. Each support bracket 175, 176 is provided with an elongated slot 177, 178. Since the mounting of the sprocket wheels 82, 86 are identical, for simplicity of discussion, only the mounting of sprocket wheel 82 will be described. As may be seen in FIGURE 13, the sprocket wheel 82 is provided with a shaft 179 which extends rearwardly therefrom and which is received by the groove 177 formed in the support bracket 175. To hold the shaft 179 in place, a washer and lock nut arrangement 180 is attached to the portion of the shaft 179 which extends through the support bracket 175. Sufficient clearance between the sprocket wheel 82 and the support bracket 175 is provided to permit unobstructed translational motion of the sprocket wheel 82 and shaft 179 relative to the support bracket 175.

In order to produce reciprocating motion in the sprocket wheels 82, 86 corresponding to the reciprocating motion of the mixing blades 18, 20, a pair of telescoping rods 181, 182 interconnect the internal gear 164 and the sprocket wheels 82, 86, respectively. The rods 181, 182 are telescoping because of the relative transverse movement between the sprocket wheels and the internal gear 164 during the reciprocating movement caused by the angular displacement of the axes 64 of the mixing blade shafts 54 and the axis of the worm gear 160. It can be seen that as the internal gear 164 traverses vertically between the limit switches 170, 172 the sprocket wheels 82, 86 similarly traverse longitudinally in the slots 177, 178 to maintain operating contact between the pinion gears 76, 78 and the worm gears 80, 84, respectively.

The idler sprocket wheel 92 is similarly supported by a support bracket 183 having an elongated slot 184 therein to permit reciprocating motion of the idler gear 92 corresponding to the motion in the other sprocket wheels. Because the idler wheel 92 maintains the desired tension in the chain 88, it is necessary to bias the idler wheel 92 downwardly and this is accomplished by a compression spring (not shown) housed within a telescoping rod 185, attached at one end to the support plate 161 and at the other end to the idler wheel shaft 186.

In operation with the blades being located at their lowermost position as illustrated in FIGURE 1, the motor 158 is started so as to rotate in a direction causing vertically upward movement of the internal gear 164, which, in turn, causes upward movement of the blades 18, 20 in their respective axial directions. The upward movement of the blades 18, 20 continues until the internal gear 164 encounters the upper limit switch 172 which then, through the motor control 174, reverses the direction of the motor 158 and causes the internal gear 164 to traverse vertically downwardly and, in turn, causes the blades 18, 20 simultaneously to traverse downwardly. The axial reciprocating motion of the mixing blades 18, 20 occurs concurrently with the rotary motion thereof as provided by the sprocket and chain drive described earlier and is permitted because of the relative rotation which occurs between the hub 150 and the arm 166 and between the hub 152 and the arm 168.

The combined rotary and axial movement of the mixing blades 18, 20 provides a mixing action heretofore unattainable. Because of the angular displacement between the blades 18, 20 and because of the conical configuration of the envelope described by the blades and the intersecting cone configuration of the receptacle 16, the clearance between the blades 18, 20 and the clearance between the blades and the receptacle are continuously varying as are the relative magnitudes of the four types of material movement described above (parallel drag flow, transverse drag flow, pressure flow, and leakage flow).

In addition to providing continuously reciprocating axial motion of the mixing blades 18, 20, this system also permits the operator of the mixing apparatus to vary the clearance between the blades and between the blades and the receptacle by simply raising or lowering the blades a finite distance and then terminating operation of the motor 158 to retain the blades in the desired position. Ability to vary the clearances is desirable where mixes of different viscosity may be worked in the receptacle 16. It is obvious that such variation in clearance can be remotely controlled which is desirable where dangerous-to-handle mixes such as solid propellants are being worked upon.

VARIABLE BLADE-TO-BLADE CLEARANCE

In addition to varying the blade-to-blade clearance by the method described above, i.e., by axial movement of the blades, this invention additionally provides means for varying the blade-to-blade clearance which involves limited rotation of one of the mixing blades with respect to the other. Referring to FIGURE 14, there is schematically illustrated the upper end or bar 60 of the two mixing blades 18 and 20. To avoid complicating the illustration, the bar 60 will be considered representative of the entire blade for purpose of discussing the variation in blade-to-blade clearance. The solid lines represent a blade orientation with a ninety degree phase shift between the blades, i.e., the phase angle $\alpha$ between corresponding parts of the blades is 90°. As one of the blades, for example, blade 18, is rotated with respect to the other blade, for example, blade 20, it can be seen that the clearance between the blades varies as a function of the phase shift. It can also be seen that the clearance between the blades is a maximum when the phase angle is 90°. The minimum clearance occurs theoretically when the phase shift is 0°, however, because of the thickness of the blade elements, the actual minimum clearance exists when the phase shift is finitely larger than 0°.

To effect variation in the phase angle between the blades 18, 20, the shaft 54 of at least one of the blades is provided with a plurality of circumferentially spaced apart holes 74, three of which are illustrated in FIGURE 3. When it is desired to vary the clearance between the blades, the pin 70, which extends through the sleeve 68 and the blade shaft 54, is removed and the blade 20 is rotated until the particular hole 74 corresponding to the desired phase shift is aligned with the hole 72 through the sleeve 68, and the pin 70 is then reinserted. Since the shear force applied to the mix is partially determined by the clearance between the blades, and for various mixes it is desirable to apply various shear forces, the ability to easily vary the blade clearance adds additional flexibility to the mixing apparatus 12.

The phase angle $\alpha$ between the blades 18, 20 may also be varied by disengaging the chain 88 from one of the sprocket wheels 82, 86 and rotating one of the sprocket wheels relative to the other. Another method to vary the phase angle $\alpha$ is to disengage one of the pinion gears 76, 78 from its respective worm gear 80, 84 and rotate one of the blades 18, 20 relative to the other.

VARYING BLADE VOLUME

Because of the generally conical configuration of the receptacle 16, it is obvious that the elemental volume, e.g., volume per unit depth, within the receptacle 16 decreases as a function of depth of the receptacle. In order to maximize the volume of mix contained within the receptacle 16 during the mixing operation and to minimize the chance of interference between the rotating blade elements 56, the elements are formed with their elemental volume decreasing as a function of depth of the retceptacle 16 or, in other words, the cross sectional area of each elements decreases along the length of the element toward the bottom of the receptacle 16. The element width which is illustrated by dimension line 187 in FIGURE 3, varies as a constant fraction of the diameter of the conical surface generated by rotation of the blade 20. Similarly, the element thickness, which is illustrated by dimension line 188 in FIGURE 3, varies as a fraction of the diameter of the conical surface of revolution. Since the parallel drag force on the mix is produced by the face or width of the element, this dimension may be maintained constant throughout the length of the blade if the particular application of the mixing apparatus 12 dictates a maximum parallel drag force such as if extrusion of the mix is required. Since the end or thickness of the elements largely determines the leakage flow rate, this dimension may or may not be varied, depending upon the particular requirements of the mixing operation. It should be noted that the variation in element width and element thickness may be employed jointly or individually, and the particular function or fraction of the conical surface diameter which determines the width and thickness need not necessarily be the same. The blade 20 illustrated in FIGURE 3 shows a joint variation in element width and thickness.

COMMUNICATION WITH MIX DURING BLADE ROTATION

It is often necessary to communicate with the mix without interfering with or ceasing the operation of the mixer. It is also desirable to be able to measure various properties of the mix during rotation of the mixing blades and to measure certain properties of a portion of the mix which is located in the central region of the receptacle. Present-day mixers do not permit communication throughout the depth of the mix and internally within the mixing receptacle during rotation of the mixing blades. This invention, however, provides for such continuous communication with the mix.

Reverting now to FIGURE 7, there is shown a mixing blade 106 having a bore 190 axially through the blade shaft 192. An axially movable conduit 194 is located within the bore 190 and extends completely through the length of the shaft 192 and out the end 196 thereof remote from the elements 108. The conduit 194 can be moved axially with respect to the blade 106 by any desired means. For example, the conduit 194 can be moved manually to a desired position and then fixed in place through the use of a stop screw 198 which extends through an internally threaded hole 200 provided laterally through the shaft 192 and abuts the conduit. Alternatively, the conduit 194 can be remotely controlled through the use of motor means (not shown) for actuation, such as a conventional solenoid drive, rack and pinion, or other similar devices which can be remotely operated.

Located within the conduit 194 is a temperature-measuring device 202 such as a thermocouple. It can be seen that the temperature of the mix can be constantly monitored throughout the depth of the mix in the center region of the receptacle 16. In place of the temperature-measuring device 202, a viscosity-measuring device such as a viscometer (not shown) can be housed within the conduit 194 to permit constant monitoring of the viscosity of the mix during the mixing operation.

This capability of communicating with the mix during operation of the mixer permits sampling of the mix during the mixing operation. This can be achieved by removing any of the instruments which may be located within the conduit 194 and attaching a pressure-reducing system, such as a conventional vacuum pump, to the conduit to effect removal of a portion of the mix. This permits sampling of the mix at any depth throughout the receptacle during rotation of the mixing blades. An additional advantage of the axially movable conduit is, it provides the ability to inject a fluid at any point within the mix. The fluid may be a liquid ingredient which is intended to be intermixed with the mix already existing in the receptacle 16 or it may be a gaseous medium. When the mixing apparatus 10 is used as a reactor, as described above, the reaction taking place within the receptacle 16 often depends upon nucleation or boiling to effect the reaction. To expedite the nucleation, it is often desirable to inject an inert gaseous medium into the lower portion of the reactants to provide a nucleation surface for supplementing the boiling function. Therefore, ability to inject a gaseous medium throughout the depth of the receptacle 16 further enhances and enlarges the total use of the mixing apparatus 10.

The mixing apparatus 10 described above and illustrated in FIGURES 1 through 14 provides rapid and total mixing of the ingredients with a maximum of flexibility of use to permit handling of ingredients of varied viscosities and varied danger potential. The mixing apparatus described permits wide variation in clearance between the rotating blades, and between the rotating blades and the receptacle walls. It increases the mixing efficiency by improving the transverse flow component as well as providing reciprocating axial movement to the mixing blades concurrent with their rotating motion. Furthermore, communication with the mix during operation of the mixer is obtainable through the means provided in the blade shafts which permits monitoring of the qualities of the mix from an external point as well as permitting injection of a fluid into the mix at any point throughout the depth of the receptacle.

While several specific embodiments have been shown and described above, it will be obvious to those skilled in the art that various changes and modifications may be made without departing from the invention in its broader aspects. Therefore, it is intended in the appended claims to cover all such changes and modifications that fall within the true spirit and scope of this invention.

What is claimed as new and desired to be secured by Letters Patent of the United States is:

1. Mixing apparatus comprising,
    (a) a receptacle having a substantially vertical axis and having an interior surface throughout its length in the nonintersecting peripheral portions of at least two intersecting cones, the base of each of said cones being displaced upwardly with respect to the apex of each of said cones, the longitudinal axis of each of said cones being inclined with respect to the axis of said receptacle at an angle such that said axes of said cones intersect below the bases of said cones,
    (b) a plurality of interdigitating mixing blades, each of said blades comprising a shaft and a plurality of blade elements which generates a substantially conical surface during rotation thereof, the apex of which is disposed adjacent to the bottom of said receptacle, one end of each of said elements being rigidly attached to said shaft and the other end of each of said elements joining at least one other of said other ends, each of said elements having a leading face and a trailing face with respect to the direction of rotation of said blade, said leading face having an angle of attack at all points along its length which is oblique to the tangential velocity vector during rotation of said blade at each of said points, respectively, said angle being formed by rotating said leading face about an axis parallel to the axis of said shaft, at least one of said blades being rotatably mounted on each of said cones,
    (c) first means for effecting relative rotational motion between said blades to vary the clearance between said blades while maintaining a predetermined clearance between said blades and said receptacle,
    (d) locking means for locking each of said blades in a desired orientation with respect to each of said other blades to maintain a desired clearance between said blades during operation thereof,
    (e) first motor means drivingly connected to each of said blades to effect rotary motion thereof, and
    (f) second motor means drivingly connected to each of said blades to effect simultaneous, corresponding, reciprocating axial motion thereof with respect to said receptacle during rotation of said blades.

2. Mixing apparatus as defined in claim 1,
    (a) wherein each of said blade elements has a width, a thickness and a length, the width of each of said elements and the thickness of each of said elements both decreasing along the length of said element with the minimum dimension of each being adjacent to the bottom of said receptacle, and
    (b) wherein each of said elements is a downwardly convergent helical strip.

3. Mixing apparatus as defined in claim 2 wherein the shaft of at least one of said blades includes a bore axially therethrough and means through said bore for communicating with a mix contained within said receptacle during operation of said blades.

4. Mixing apparatus as defined in claim 3 wherein said means through said bore comprises a device axially movable through said bore throughout the length of said blade.

5. Mixing apparatus as defined in claim 4 wherein said device comprises a mix temperature measuring means.

6. Mixing apparatus as defined in claim 4 wherein said device comprises a mix viscosity measuring means.

7. Mixing apparatus as defined in claim 4 wherein said device comprises a pressure-reducing means to effect removal of a portion of said mix from said receptacle.

8. Mixing apparatus as defined in claim 4 wherein said device comprises means for adding a fluid to said mix.

9. A mixing blade adapted for rotatable mounting within a substantially vertically oriented receptacle, said blade comprising a shaft and a plurality of elements rigidly attached to said shaft, each of said elements being of generally helical ribbon configuration and having a leading face and a trailing face with respect to the direction of rotation of said blade, said leading face having an angle of attack at all points along its length which is oblique to the tangential velocity vector during rotation of said blade at each of said points, respectively, said angle being formed by rotating said leading face about an axis parallel to the axis of said shaft.

10. A mixing blade as defined in claim 9 wherein each of said elements has a rectangular cross section and wherein said leading face is oriented inwardly toward said shaft axis.

11. A mixing blade as defined in claim 9 wherein each of said elements has a rectangular cross section and wherein said leading face is oriented outwardly away from said shaft axis.

12. A mixing blade as defined in claim 9 wherein the cross section of each of said elements is triangular with said leading face having a portion thereof oriented inwardly toward said shaft axis and a portion thereof oriented outwardly away from said shaft axis.

13. A mixing blade as defined in claim 9 wherein the cross section of each of said elements is trapezoidal with said leading face having a first portion thereof oriented inwardly toward said shaft axis, a second portion thereof oriented perpendicular to said velocity vector, and a third portion thereof oriented outwardly away from said shaft axis.

14. A mixing blade as defined in claim 9 wherein the cross section of each of said elements is a rhombus with said leading face having a portion thereof oriented inwardly toward said shaft axis and a portion thereof oriented outwardly away from said shaft axis and wherein said trailing face has a portion thereof oriented inwardly toward said shaft axis and a portion thereof oriented outwardly away from said shaft axis.

15. A mixing blade adapted for rotatable mounting within a substantially vertically oriented receptacle, said blade comprising a shaft and a plurality of blade elements of generally helical ribbon configuration which generate a substantially conical surface during rotation thereof, the apex of which is disposed adjacent to the bottom of said receptacle, one end of each of said elements being rigidly attached to said shaft and the other end of each of said elements joining at least one other of said other ends, each of said elements having a leading face and a trailing face with respect to the direction of rotation of said blade, said leading face having an angle of attack at all points along its length which is oblique to the tangential velocity vector during rotation of said blade at each of said points, respectively, said angle being formed by rotating said leading face about an axis parallel to the axis of said shaft.

16. A mixing blade as defined in claim 15 wherein each of said elements is a downwardly convergent helical strip.

17. A mixing blade as defined in claim 15 wherein the cross section of each of said elements is rectangular and wherein said leading face is oriented inwardly toward said shaft axis.

18. A mixing blade as defined in claim 17 wherein each of said elements is a downwardly convergent helical strip.

19. A mixing blade as defined in claim 15 wherein said leading face is oriented outwardly away from said shaft axis.

20. A mixing blade as defined in claim 19 wherein each of said elements is a downwardly convergent helical strip.

21. A mixing blade as defined in claim 15 wherein the cross section of each of said elements is triangular with said leading face having a portion thereof oriented inwardly toward said shaft axis and a portion thereof oriented outwardly away from said shaft axis.

22. A mixing blade as defined in claim 21 wherein each of said elements is a downwardly convergent helical strip.

23. A mixing blade as defined in claim 15 wherein the cross section of each of said elements is trapezoidal with said leading face having a first portion thereof oriented inwardly toward said shaft axis, a second portion thereof oriented perpendicular to said velocity vector and a third portion thereof oriented outwardly away from said shaft axis.

24. A mixing blade as defined in claim 23 wherein each of said elements is a downwardly convergent helical strip.

25. A mixing blade as defined in claim 15 wherein the cross section of each of said elements is a rhombus with said leading face having a portion thereof oriented inwardly toward said shaft axis and a portion thereof oriented outwardly away from said shaft axis and wherein said trailing face has a portion thereof oriented inwardly toward said shaft axis and a portion thereof oriented outwardly away from said shaft axis.

26. A mixing blade as defined in claim 25 wherein each of said elements is a downwardly convergent helical strip.

27. In combination, a mixing blade of generally helical ribbon configuration rotatably mounted within a substantially vertically oriented receptacle having an interior surface of generally conical shape, the base of which is displaced upwardly with respect to the apex thereof, said blade generating a substantially conical surface during rotation thereof, the apex of which is disposed adjacent to the bottom of said receptacle, and motor means for continuously varying the clearance between said blade and said receptacle, said motor means comprising means for providing jointly reciprocating axial motion to said blade with respect to said receptacle and rotational motion to said blade.

28. Mixing apparatus comprising,
(a) a substantially vertically oriented receptacle having an interior surface of generally conical shape, the base of which is displaced upwardly with respect to the apex thereof,
(b) a plurality of mixing blades rotatably mounted within said receptacle, each of said blades comprising a shaft and a plurality of blade elements which generate a substantially conical surface during rotation thereof, the apex of which is disposed adjacent to the bottom of said receptacle, one end of each of said elements being rigidly attached to said shaft and the other end of each of said elements joining at least one other of said other ends,
(c) first motor means drivingly connected to each of said blades to effect rotary motion thereof, and
(d) second motor means drivingly connected to each of said blades for providing simultaneous, corresponding reciprocating axial motion thereof with respect to said receptacle during rotation of said blades.

29. Mixing apparatus as defined in claim 28 wherein the elements of each of said blades interdigitate with the elements of each other of said blades and wherein the axis of each of said blades is inclined with respect to the axis of said receptacle and with respect to the axis of the other of said blades such that said reciprocating axial motion of each of said blades effects continuous variation in clearance between the blades and between the blades and the receptacle.

30. Mixing apparatus as defined in claim 29 wherein each of said elements is a downwardly convergent helical strip.

31. Mixing apparatus as defined in claim 29 wherein said receptacle has an interior surface throughout its length in the shape of the nonintersecting peripheral portions of at least two intersecting cones, the base of each of said cones being displaced upwardly with respect to the apex of each of said cones, the longitudinal axis of each of said cones being inclined with respect to the axis of said receptacle at an angle such that said axes of said cones intersect below the bases of said cones.

32. Mixing apparatus comprising,
(a) a substantially vertically oriented receptacle having an interior surface of generally conical shape, the base of which is displaced upwardly with respect to the apex thereof,
(b) a plurality of interdigitating mixing blades rotatably mounted within said receptacle, each of said blades comprising a shaft and a plurality of blade elements which generate a substantially conical surface during rotation thereof, the apex of which is disposed adjacent to the bottom of said receptacle, one end of each of said elements being rigidly attached to said shaft and the other end of each of said elements joining at least one other of said other ends,
(c) means for effecting relative rotational motion between said blades to vary the clearance between said blades while maintaining a predetermined clearance between said blades and said receptacle, and
(d) means for locking each of said blades in a desired orientation with respect to each of said other blades to maintain a desired clearance between said blades during operation thereof.

33. Mixing apparatus as defined in claim 32 wherein each of said elements is a downwardly convergent helical strip and wherein the axis of each of said blades is inclined with respect to the axis of said receptacle and the axis of the other of said blades.

34. In combination, a substantially vertically oriented generally cone-shaped receptacle and a mixing blade rotatably mounted within said receptacle, said blade comprising a shaft and a plurality of downwardly convergent helical blade elements which generate a substantially conical surface during rotation thereof, the apex of which is disposed adjacent to the apex of said receptacle, one end of each of said elements being rigidly attached to said shaft and the other end of each of said elements joining at least one other of said other ends, each of said elements having a width, a thickness, and a length, the cross sectional area established by said width and said thickness of each of said elements decreasing along the length of said element toward said apex.

35. In combination, a substantially vertically oriented generally cone-shaped receptacle and a plurality of interdigitating mixing blades rotatably mounted within said receptacle, each of said blades comprising a shaft and a plurality of downwardly convergent helical blade elements which generate a substantially conical surface during rotation thereof, the apex of which is disposed adjacent the apex of said receptacle, one end of each of said elements being rigidly attached to said shaft and the other end of each of said elements joining at least one other of said other ends, each of said elements having a width, a thickness, and a length, the cross sectional area established by said width and said thickness of each of said elements decreasing along the length of said element toward said apex.

References Cited by the Examiner

UNITED STATES PATENTS

| | | | |
|---|---|---|---|
| 1,479,511 | 1/1924 | Parsons | 259—134 |
| 1,729,631 | 10/1929 | Stay | 259—134 |
| 1,826,242 | 10/1931 | Dehuff | 259—134 |
| 2,871,000 | 1/1959 | Dowling | 259—8 |
| 3,158,358 | 11/1964 | Fischer | 259—8 |
| 3,226,097 | 12/1965 | Vayda et al. | 259—41 |

FOREIGN PATENTS 856,708  12/1960  Great Britain.

IRVING BUNEVICH, *Primary Examiner.*

WALTER A. SCHEEL, R. W. JENKINS,
*Assistant Examiners.*

UNITED STATES PATENT OFFICE
CERTIFICATE OF CORRECTION

Patent No. 3,314,660                         April 18, 1967

William Arbiter

It is hereby certified that error appears in the above numbered patent requiring correction and that the said Letters Patent should read as corrected below.

Column 12, line 21, after "in the" insert -- shape of the --.

Signed and sealed this 14th day of November 1967.

(SEAL)

Attest:

Edward M. Fletcher, Jr.

Attesting Officer

EDWARD J. BRENNER

Commissioner of Patents